United States Patent
Lesner et al.

(10) Patent No.: US 9,892,106 B1
(45) Date of Patent: Feb. 13, 2018

(54) METHODS, SYSTEMS AND ARTICLES FOR CORRECTING ERRORS IN ELECTRONIC GOVERNMENT FORMS

(71) Applicant: Intuit Inc., Mountain View, CA (US)

(72) Inventors: Christopher Lesner, Palo Alto, CA (US); Alexander S. Ran, Palo Alto, CA (US)

(73) Assignee: INTUIT INC., Mountain View, CA (US)

(*) Notice: Subject to any disclaimer, the term of this patent is extended or adjusted under 35 U.S.C. 154(b) by 619 days.

(21) Appl. No.: 14/448,270

(22) Filed: Jul. 31, 2014

(51) Int. Cl.
*G06F 17/22* (2006.01)
*G07F 19/00* (2006.01)
*G06F 17/24* (2006.01)
*G06Q 50/26* (2012.01)
*G06Q 40/00* (2012.01)
*G06N 99/00* (2010.01)

(52) U.S. Cl.
CPC ......... *G06F 17/243* (2013.01); *G06N 99/005* (2013.01); *G06Q 40/123* (2013.12); *G06Q 50/26* (2013.01)

(58) Field of Classification Search
None
See application file for complete search history.

(56) References Cited

U.S. PATENT DOCUMENTS

| | | | | | |
|---|---|---|---|---|---|
| 5,822,741 | A | * | 10/1998 | Fischthal | G06K 9/62 705/31 |
| 2011/0249905 | A1 | * | 10/2011 | Singh | G06K 9/00449 382/225 |

* cited by examiner

*Primary Examiner* — Jason Borlinghaus
(74) *Attorney, Agent, or Firm* — Vista IP Law Group LLP; Gary D. Lueck

(57) ABSTRACT

Methods, systems and articles of manufacture for analyzing a government form for a filer to be filed with an appropriate government agency. A computerized form analysis system receives a plurality of data values for completing the government form. The system creates a first feature vector using the plurality of data values representing the first government form. The form analysis system compares the first feature vector to a set of training set feature vectors for previously filed government forms. Each of the training set feature vectors is associated with a respective known outcome in filing the form, such as a positive outcome or negative outcome. The system determines that the first feature vector is similar to one or more training set feature vectors and based upon this determination, and the likelihood of an expected outcome in filing the first government form based on this determination.

40 Claims, 5 Drawing Sheets

METHODS, SYSTEMS AND ARTICLES FOR CORRECTING ERRORS IN ELECTRONIC GOVERNMENT FORMS

BACKGROUND

The invention relates to methods, systems and apparatus for the filing of electronic forms with the government; and more particularly, to new methods, systems and apparatus for detecting and correcting errors in electronic forms filed with the government.

Every year, millions of forms are filed with the governmental agencies in the United States (U.S.) and around the world. For example, in the U.S., millions of federal, state and local tax returns, SEC (Securities and Exchange Commission) filings, and other government benefit forms, such as applications for government benefits, are filed. Many of these forms are now able to be filed electronically, such as by preparing an electronic form for filing with the appropriate government agency. For instance, some forms are available to be completed online via a website, and some forms may be completed using online or standalone software applications which are configured to receive data for completing the form and then creating a form data file for electronic submission to the appropriate government agency.

Since tax returns are one of the most common electronic forms filed with government agencies, many of the examples described herein are directed to the preparation and filing of a tax return. However, the present invention is not limited to tax returns, and may be similarly applied to any electronic forms filed with a government agency.

Tax returns are forms filed by a taxpayer with a tax agency, such as the Internal Revenue Service (IRS), a state tax authority (e.g. California Franchise Tax Board), city tax authority, or other tax collecting agency, containing information for determining the tax liability of the taxpayer. Computerized (also referred to as "electronic") tax return preparation applications have become very popular and allow a user, such as a taxpayer or a tax professional, to prepare and electronically file a tax return using a computing device (e.g. personal computer, tablet computer, smart phone, etc.). The tax preparation application may be a desktop application that resides and operates on the computer operated by the user or an online application that resides on a server that is accessible by the user's computer via a network such as the internet. The interface for a server based application can be an internet browser or specialized software residing on the local computer. There are a number of examples of desktop software applications and online tax preparation applications for preparing tax returns. Examples of desktop applications are TurboTax® software for PC and Mac, ProSeries® and Lacerte® tax preparation applications, which are known consumer and professional tax preparation applications available from Intuit Inc., Mountain View, Calif., H&R Block TaxCut software, available from H&R Block, Inc., Kansas City, Mo., and TaxACT® software available from $2^{nd}$ Story Software, Inc. Examples of online tax return preparation applications are Turbotax® Online, H&R Block Online tax prep, and TaxACT® Online.

Whether a desktop application or an online application, the use of the application to prepare a computerized tax return may be basically the same. For example, certain tax preparation applications present a list of tax-related questions or data entry fields to the user as a series of interview screens or fillable forms, in response to which the user enters the appropriate data or answers if they are known. For example, certain interview screens or questions may relate to personal and family information such as the user's social security number, marital status, number of dependents, etc. Other interview screens and questions may relate to the taxpayer's finances such as wages, retirement plan contributions, and social security, state and federal taxes that were paid or withheld as provided in Form-W2. The data fields of an electronic tax return may be entered in many other ways, as well. For example, data may be entered into the electronic tax return by filling in data fields in a fillable form, the data may be electronically imported from financial service providers of the taxpayer (such as banks, stock brokers, financial planners, etc.), the data may be transferred from another database on the computer or remotely stored on a different computer or storage device/server, and/or the data may be transferred from a previous year's tax return, or from any other suitable source.

Further, an electronic tax return may be a business or corporate return, and the tax data fields may, for example, relate to payments and benefits such as contributions to a retirement plan. Thus, data fields may relate to travel expenses or determinations of portions of expenses that are deductible.

Upon entry of all of the taxpayer data, the tax preparation application prepares an electronic tax return. The electronic tax return is then processed and formatted into an electronic tax return data file according to the requirements and specifications of the pertinent tax agency to which the tax return is being filed. Finally, the electronic tax return data file is filed with the appropriate tax authority such as the Internal Revenue Service (IRS), a state tax authority (e.g. California Franchise Tax Board), city tax authority, or other tax collecting agency, by transmitting the electronic tax return data file to the tax authority. Alternatively, the tax return data file can used to create a paper forms submission in which the tax return forms are printed and then submitted to the appropriate tax authority.

Upon receipt of the electronic tax return data file, the tax agency typically runs a validation on the data file to check for certain errors in the tax return. If the tax agency detects error(s), then the tax return submission is rejected, and a rejection message and an error message identifying the errors may be sent to the submitter of the tax return.

A similar procedure is available for preparing and filing other government forms, such as SEC forms and the like.

SUMMARY

Embodiments of the present invention are directed to methods, systems and articles of manufacture for analyzing an electronic form to be filed with the appropriate government agency. As used herein, the term "electronic form" refers to an electronic data file having data representative of the information for completing the particular government form for submission to the appropriate government agency. As some examples, the electronic form may be a tax return, such as a federal tax return or state or local tax return, SEC filings, and other government benefit forms, such as applications for government benefits.

Embodiments of the invention may be implemented on a computerized form analysis system comprising one or more computers, including any electronic computing device having a processor, memory, a communication interface and software programming, such as a computer system, personal computer, server computer (e.g. website server), mainframe computer, portable computer, tablet computer, smartphone, or the like. The computer may also include multiple computers operably linked together. The computerized form analysis system can be a stand-alone system, such as a computer system, personal computing device (such as a personal computer, tablet computer, mobile phone, or smartphone), or it can be an online system that is accessible by a computing device (such as a computer system which may include multiple computers operably linked together, a personal computer, a tablet computer, a mobile phone, a smartphone, etc.) via a communication network such as the internet or proprietary network, or combination thereof. The form analysis system is configured and has software programming, as described in further detail below.

The present invention can be used with various form preparation software systems and applications, including but not limited to tax return preparation software systems and applications. With respect to tax return preparations software systems and applications, the present invention includes only that part of a method, apparatus, technology, computer program product, or system that is used solely for assisting in preparing a tax or information return or other tax filing, including one that records, transmits, transfers, error checks or organizes data related to such filing. The present invention does not include any strategy for reducing, avoiding, or deferring tax liability.

Accordingly, one embodiment of the present invention is directed to a method for analyzing a first electronic government form for a filer to be submitted to a government agency responsible for receiving and processing the electronic form. Typically, the electronic government form includes a plurality of data fields to be completed in filling out the form. As described above, the method is implemented on a computerized form analysis system. The method comprises the form analysis system receiving a plurality of data values for completing a first government form for the filer. The data values are information and field values for completing, or from the completed, data fields of the form and/or for calculating the fields of the form.

The form analysis system uses the plurality of data values to create a first feature vector representing the first government form. A feature vector is an n dimensional vector of numerical values representing the data values of an object or subject matter, in this case a government form. Accordingly, the first feature vector is a feature vector representing the data values of the first government form, and a feature vector of any other government form is similarly constructed.

The form analysis system then compares the first feature vector to a set of training set feature vectors for previously filed government forms of the same type of government form as the first government form. Each training set feature vector is a feature vector (as explained above) of a previously filed government form of the same type as the government form. Each of the training set feature vectors is associated with a respective known outcome, such as a negative outcome (e.g. the form was rejected by the agency) or a positive outcome (e.g. the form was accepted by the agency). For each training set feature vector associated with a respective negative outcome, the training set feature vector is also associated with a respective reason for the negative outcome, and respective corrective information. For instance, the negative outcome may be a rejection of the form by the government agency, and the reason may be an error an error in a data field of the form, such as a data field that is empty when a value is required, or a data field that has the wrong type of data (e.g. text data when a number is required), or a data field that is miscalculated based on other data in the form, etc. The respective corrective information comprises modifications made to the respective previously filed government forms which fixed the respective negative outcome. As an example, if negative outcome was a rejection caused by a missing data field, the corrective information may be the filling in of the data field based on using other data, such as data calculated from other data values in the field or requesting and receiving further data input from a preparer of the form, or reformatting the data value in the field to meet correct the reason for the rejection, etc.

The form analysis system determines that the first feature vector is similar to one or more of the training set feature vectors, the similar training set feature vectors referred to as "the similar feature vectors." This may be done by any suitable method, such as by determining a distance metric, such as the euclidian distance, between the first feature vector and determining that each of the similar feature vectors is less than a first predetermined value. Each of the similar training set feature vectors is associated with a respective known outcome and if a negative outcome, a respective reason and corrective information.

Then, the form analysis system determines a likelihood of a first expected outcome in filing the first government form based on determining that the first feature vector is similar to the similar feature vectors. In other words, since the first feature vector is determined to be similar to previously filed feature vectors associated with respective known outcomes, then the first feature vector has data values similar to the similar feature vectors, and thus it is likely that the first government form will also result in the same or similar expected outcome.

In another aspect of the method, if the expected outcome is a first negative outcome, the form analysis system may also perform steps to assist in fixing the first government form to avoid the likelihood of a negative outcome, such as having the first government form rejected by the government agency. The form analysis system determines a suggestion for modifying one or more of the data values based on analyzing the corrective information associated with the similar feature vectors. For instance, if many of the similar feature vectors have corrective information indicating a certain correction which overcame the first negative outcome having the first reason, then the form analysis system will suggest the same correction.

The form analysis system provides the suggestion to a preparer of the form (i.e. a person, system and/or computing device which is preparing the form) and requests input from the preparer to modify one or more data values to reduce the likelihood of the negative outcome. The preparer provides instructions to modify the one or more data values in the suggestion, which instructions are received by the form analysis system.

In still another aspect, the form analysis system may then analyze a modified first government form using the one or more modified data values in the suggestion, for example, to determine whether the first government form using the modified values still has a likelihood of a negative outcome or has been corrected to avoid a likelihood of a negative outcome. The form analysis system modifies the one or more data values according to the instructions received from the preparer. The form analysis system creates a modified feature vector using the modified data values. The form analysis system compares the modified feature vector to the set of training set feature vectors and determines that the modified feature vector is similar to one or more training set feature vectors, referred to as "the modified similar feature vectors". The form analysis system may make this determination by determining that a distance metric (e.g. euclidian distance) between the modified feature vector and the one or more modified similar feature vectors is greater than a second predetermined value. The second predetermined value may be the same as the first predetermined value, or it may be different, such as in order to provide a level of hysteresis to the analysis.

In yet another aspect of the method, the form analysis system may create the set of training set feature vectors. The system accesses (including receiving, reading, etc.) a plurality of previously filed government forms, and/or the data values from a plurality of previously filed government forms, of the same type as the first government form. The system also accesses filing data including the filing outcome (e.g. positive outcomes such as accepted, negative outcomes such as rejected, or other outcome from the filing of the government form), and the reason(s) for such outcome for each of the previously filed government forms. The form analysis system also accesses corrective information for each of the previously filed government forms including modifications made to each respective previously filed government form which fixed a negative outcome for the previously filed government form. The form analysis system accesses the data values from each of the plurality of governments forms, and uses the data values to create a feature vector for each of the previously filed government forms. The form analysis system also associates the respective filing outcome, respective reason and respective corrective information with each of the previously filed government forms.

In still another aspect of the method, the government form may be an electronic tax return for a taxpayer to be filed with an appropriate tax agency. Accordingly, the form analysis system may be a tax return analysis system, which is the same or similar to the form analysis system described above, and the method is for analyzing a tax return to be filed by a taxpayer with. The tax return may be prepared on and/or by a tax preparation system and application. The tax return analysis system may be a stand-alone system separate from the tax preparation system, or it may be integrated with the tax return analysis system.

Another embodiment of the present invention is directed to a form analysis system for implementing one or more of the described methods for analyzing an electronic government form for a filer to be filed with an appropriate government agency. The form analysis system comprises one or more computers operably coupled to each other, each having a processor, memory operably coupled to the processor, a communication interface and software programming. The system may also include servers, data storage devices, and one or more displays. The system is configured and programmed to perform a process according to any of the method embodiments of the present invention. For instance, the system may be configured for: receiving a plurality of data values for completing the first government form for the filer, the form analysis system comprising at least one computer having a computer processor and software programming; creating a first feature vector using the plurality of data values; comparing the first feature vector to a set of training set feature vectors for previously filed government forms of the same type of government form as the first government form, each of the training set feature vectors associated with a respective known outcome, and for each training set feature vector having a known negative outcome, a respective reason for such negative outcome, and respective corrective information comprising modifications made to the respective previously filed government forms which fixed the respective negative outcome; determining that the first feature vector is similar to one or more training set feature vectors, the similar training set feature vectors referred to as "the first similar feature vectors"; and determining a likelihood of a first expected outcome in filing the first government form based on determining that the first feature vector is similar to the first similar feature vectors.

The form analysis system may be a stand-alone system separate from the tax preparation system, or it may be integrated with the tax return analysis system. In addition, The form analysis system may be implemented on a computing system operated by the user or an online application operating on a web server and accessible using a computing device via a communications network such as the internet.

In additional aspects, the form analysis system may be further configured according to the additional aspects described above for the method of analyzing a government form.

Another embodiment of the present invention is directed to a tax return analysis and/or preparation system for implementing one or more of the described methods for analyzing a tax return for a taxpayer to be filed with an appropriate tax agency. The tax return analysis system may be the same or similar to the form analysis system, except that it is configured to analyze a tax return. As described above, the tax return analysis system may be a stand-alone system separate from the tax preparation system, or it may be integrated with the tax return analysis system.

The tax return analysis system is configured and programmed to perform a process according to any of the method embodiments of the present invention. For example, the tax return preparation system may be configured for: receiving a plurality of data values for preparing the tax return, the tax return analysis system comprising at least one computer having a computer processor and software programming; creating a first feature vector using the plurality of data values; comparing the first feature vector to a set of training set feature vectors for previously filed tax returns, comparing the first feature vector to a set of training set feature vectors for previously filed tax returns, each of the training set feature vectors associated with a respective known outcome, and for each training set feature vector having a known negative outcome, a respective reason for such negative outcome, and respective corrective information comprising modifications made to the respective previously filed government forms which fixed the respective negative outcome; determining that the first feature vector is similar to one or more training set feature vectors, the similar training set feature vectors referred to as "the first similar feature vectors"; and determining a likelihood of a first expected outcome in filing the first tax return based on determining that the first feature vector is similar to the first similar feature vectors.

In additional aspects, the tax return analysis system may be further configured according to the additional aspects described above for analyzing a tax return.

Another embodiment of the present invention is directed to an article of manufacture comprising a non-transitory computer readable medium embodying instructions executable by a computer to execute a process according to any of the method embodiments of the present invention, including, for instance, a process comprising: receiving a plurality of data values for completing the first government form for the filer; creating a first feature vector using the plurality of data values; comparing the first feature vector to a set of training set feature vectors for previously filed government forms of the same type of government form as the first government form, each of the training set feature vectors associated with a respective known outcome, and for each training set feature vector having a known negative outcome, a respective reason for such negative outcome, and respective corrective information comprising modifications made to the respective previously filed government forms which fixed the respective negative outcome; determining that the first feature vector is similar to one or more training set feature vectors, the similar training set feature vectors referred to as "the first similar feature vectors"; and determining a likelihood of a first expected outcome in filing the first government form based on determining that the first feature vector is similar to the first similar feature vectors.

In another aspect of the computer readable medium, the process may further comprise the additional aspects described above for the method of analyzing a government form.

Still another embodiment of the present invention is directed to an article of manufacture comprising a non-transitory computer readable medium embodying instructions executable by a computer to execute a process comprising: receiving a plurality of data values for preparing the tax return; creating a first feature vector using the plurality of data values; comparing the first feature vector to a set of training set feature vectors for previously filed tax returns, comparing the first feature vector to a set of training set feature vectors for previously filed tax returns, each of the training set feature vectors associated with a respective known outcome, and for each training set feature vector having a known negative outcome, a respective reason for such negative outcome, and respective corrective information comprising modifications made to the respective previously filed government forms which fixed the respective negative outcome; determining that the first feature vector is similar to one or more training set feature vectors, the similar training set feature vectors referred to as "the first similar feature vectors"; and determining a likelihood of a first expected outcome in filing the first tax return based on determining that the first feature vector is similar to the first similar feature vectors.

In another aspect of the computer readable medium, the process may further comprise the additional aspects described above for the method of analyzing a tax return.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION OF ILLUSTRATED EMBODIMENTS

Figure 1A:
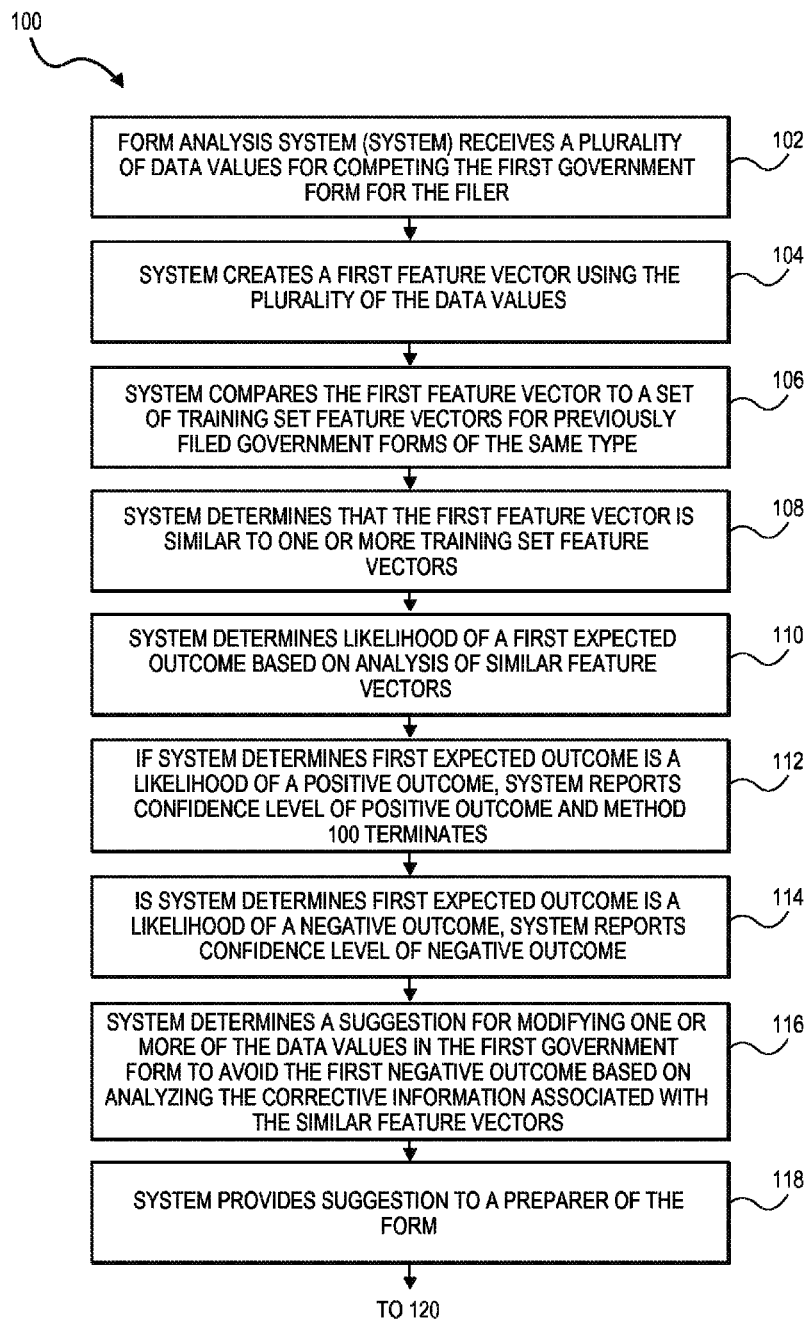
FIGS. 1A and 1B are a flow chart of a computer-implemented method for analyzing a government form for a filer to be filed with an appropriate government agency, according to one embodiment of the present invention.

Embodiments of the present invention are directed to methods, systems and articles of manufacture for analyzing a government form for a filer to be filed with an appropriate government agency. A government form may be a single form or a collection of form for filing together. In general, a computerized form analysis system receives a plurality of data values for completing the government form for the filer. The form analysis system creates a first feature vector using the plurality of data values such that the feature vector represents the first government form. The form analysis system estimates a likelihood of an expected outcome in filing the form based on similarity of the first feature vector to feature vectors with known outcomes from within a set of feature vectors for previously filed government forms of the same type as the first government form (e.g. if the first government form is a federal tax return, then each of the previously filed forms is also a federal tax return). Each of the training set feature vectors is associated with a respective positive or negative outcome, such as a rejection error or a subsequent tax audit, and (if known) a reason for the negative outcome, or an acceptance by the government agency and/or no subsequent audit in the case of a positive outcome. Each training set feature vector having a negative outcome is also associated with corrective information comprising modifications made to the previously filed government forms which corrected or overcame the negative outcome. As used herein, each of the feature vectors for previously filed government forms is referred to as a "training set feature vector", and the set of training set features vectors is referred to as "training set" or "set of training set feature vectors"). In one embodiment, the first feature vector is used to identify one or more similar training set feature vectors and to determine an outcome estimate based on a preponderance of known outcomes in the identified training set feature vector(s). When doing so the system compares the first feature vector to a set of training set feature vectors. By comparing them, the form analysis system determines that the first feature vector is similar to one or more of the training set feature vectors, referred to as the "similar feature vectors." In some embodiments, the form analysis system determines a likelihood of an expected outcome in filing the first government form based on the number of similar training set feature vectors and their respective known outcomes. For instance, if many of the similar training set feature vector filings correspond to a negative outcome such as a rejection, the system will determine that there is a high likelihood that the first government form will also be rejected. Additionally if many of the similar feature vector filings have similar amendments that corrected or overcame the negative outcome and lead to a positive outcome, a recommendation for a similar correction can be proposed to prevent the negative outcome.

As tax return forms are one of the most common electronic forms filed with government agencies, examples for analyzing a tax return will be included with the description of the embodiments. However, the present invention is not limited to tax returns, and may be similarly applied to any electronic forms filed with a government agency.

Figure 1B:
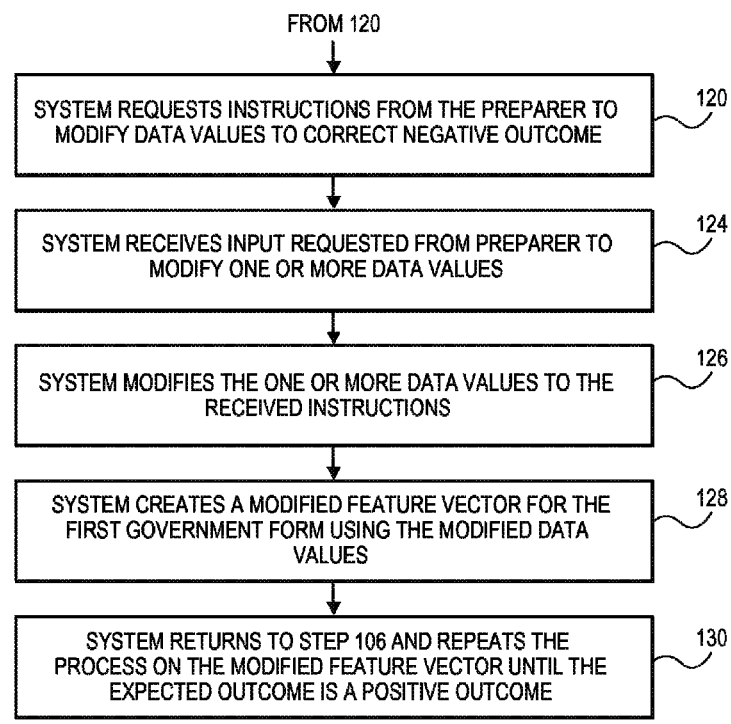

Referring to FIG. 1, in one embodiment, a computer-implemented method 100 for analyzing an electronic government form for a filer to be filed with an appropriate government agency is shown. The electronic government form includes a plurality of data fields to be completed for filling out the form for the filer. As an example, for a federal tax return for a taxpayer to be filed with the IRS, the form may be a Form 1040 or variant. The federal tax return has many data fields in the main form, as well as schedules, worksheets and supplements which may be attachments to the tax return and/or used to derive and/or calculate the data fields in the federal tax return.

The computerized method 100 is implemented on a computerized form analysis system, as described above, which is configured to perform the method 100, such as system 300 shown in FIG. 3, and described in more detail below. At step 102 of the method 100, the form analysis system receives a plurality of data values for completing a first government for a filer to be filed with an appropriate government agency. The data values comprise information for completing the form, such as the actual field values for the form data fields and/or information used to derive and/or calculate the fields of the first government form. In the case of a federal tax return, the data values may be personal information, taxpayer information, W-2 income data, other income data, deduction data, etc.

The data values may be received as a preparer of the first government form is preparing the form, such as on a form preparation system or application, or after the first government form has been completely filled out. For a federal tax return, the data values may be received as the preparer is entering the taxpayer data values into a tax preparation system and/or application (such as TurboTax® software for PC and Mac, ProSeries® and Lacerte®, H&R Block TaxCut TaxACT®, H&R Block Online tax prep, and TaxACT® Online), or after all of the data values have been entered and calculated such as after the tax return has been completely prepared by the tax preparation application.

Generally, the form analysis system receives the data values prior to submission of the first government form to the government agency, so that the form may be analyzed, checked and modified/corrected before it is submitted. Thus, typically, but not required, the method 100 and the form analysis system is not operated by or on behalf of the tax agency, and is instead operated by an entity that is separate and independent from the government agency.

The data values may be received by the form analysis system in the final form of a government form data file which is in a format according to a data file format standard for electronic submission of the government form to the government agency. Thus, in the case of a tax return, the data values may be received in the form of a tax return data file which is in a format according to a data file format standard for electronic submission of the tax return to the appropriate tax agency. For instance, the IRS has certain data file format standards for an electronic tax return data file, including the file type, field format and location, etc. In other words, the tax return data file is in the final format for submission to the tax agency.

If using a form preparation application, the form preparation application may prepare a first government form data file in the form ready for submission to the government agency. As described above, the tax return data file may be created by a tax return software application which receives the taxpayer tax data, and then processes the tax return data to prepare an electronic tax return. The software application then creates an tax return data file in the data file format for the respective tax agency such that the tax return data file is ready for electronic submission to the tax agency.

At step 104, the form analysis system creates a first feature vector using the plurality of data values. The feature vector is an n dimensional vector of numerical values representing the data values of the first government form. The rules for encoding the feature vector may be defined by experts in the particular government form, such as tax experts for a tax return. A suitable feature vector encoding enables the use of distance metrics, such as euclidian distance, to measure the similarity or difference between any two feature vectors representing two different government forms of the same type. The feature vector created by the form analysis system may also be compressed to reduce the size of the feature vector by grouping certain data fields which are known or determined to be related to each other, and rejecting certain data fields which are known or determined to be irrelevant or less relevant to the analysis of the feature vectors as described below. This provides a quantization factor for each feature vector allowing the use of a lower dimensional feature vector.

At step 106, the form analysis system compares the first feature vector to a set of training set feature vectors for previously filed government forms of the same type of government form as the first government form. For instance, if the first government form is a federal tax return, the previously filed government forms are also federal tax returns. The previously filed government forms may be for different tax years, or for the same tax year, depending on the desired comparison. Each of the training set feature vectors is associated with a respective known outcome such as a negative outcome or a positive outcome, a respective reason for the known outcome, and respective corrective information. For instance, the known outcome may be the result of filing the previously filed government for with the government agency. A positive outcome may be that the form was accepted by the government agency, or it resulted in a successful result such as an approved application for a government benefit, or for a tax return, it was accepted and/or did not result in a tax audit. A negative outcome may be that the form was rejected by the government agency, or it resulted in an unsuccessful result such as a unapproved application for a government benefit, or for a tax return, it was rejected and/or resulted in a tax audit. The reason for a positive outcome may be a certain data value or aspect of the form, or a certain level of completion of data fields, or other feature(s) common to forms having a positive outcome. The reason for a negative outcome may be a data field that is empty when a value is required, or a data field that has the wrong type of data (e.g. text data when a number is required), or a data field that is miscalculated based on other data in the form, etc. The respective corrective information comprises modifications made to the respective previously filed government forms which fixed the respective negative outcome. As an example, if a negative outcome was a rejection caused by a data field having the wrong type of data, the corrective information may be the filling in of the data field based on using other data, such as data derived from other data values in the field or requesting and receiving further data input from a preparer of the form, or reformatting the data value in the field to meet correct the reason for the rejection, etc.

Figure 2:
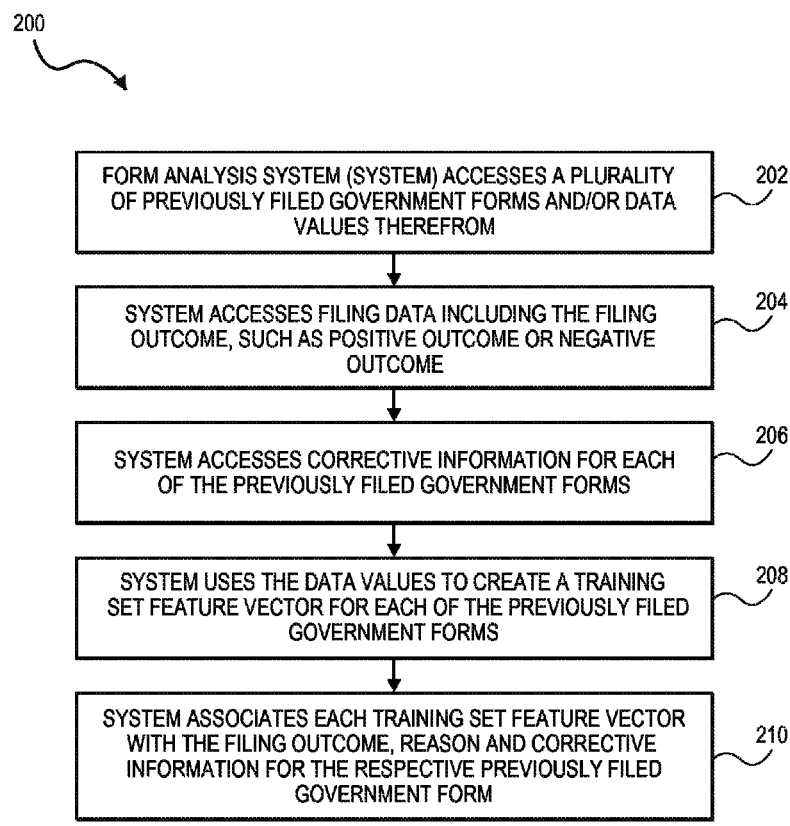
FIG. 2 is a flow chart of a computer-implemented method for creating a set of training set feature vectors, according to another embodiment of the present invention.

Referring now to FIG. 2, the method 100 may also include a method 200 for creating the set of training set feature vectors, or the method 100 may simply utilize a previously created database having a set of training set feature vectors. The method 200 comprises step 202 in which the form analysis system accesses a plurality of previously filed government forms, and/or the data values from a plurality of previously filed government forms, of the same type as the first government form. The term "accessing" includes receiving, reading, or otherwise obtaining the information. At step 204, the system accesses filing data including the known outcome of filing (e.g. positive outcomes such as accepted, negative outcomes such as rejected, or other outcome from the filing of the government form), and the reason(s) for such known outcome for each of the previously filed government forms. At step 206, the form analysis system also accesses corrective information for each of the previously filed government forms having negative outcomes. The corrective information includes the modifications made to each respective previously filed government form which fixed the negative outcome for the previously filed government form. At step 208, the form analysis system uses the data values to create a training set feature vector for each of the previously filed government forms. At step 210, the form analysis system associates each training set feature vector with the filing outcome, reason and corrective information for the respective previously filed government form.

At step 108 of method 100, the form analysis system determines that the first feature vector is similar to one or more training set feature vectors, referred to as the "similar feature vectors." The system may make the determination of similarity by any suitable method, such as by calculating a distance metric (e.g. euclidian distance) between the first feature vector and each of the training set feature vectors, as is known in the field of vector mathematics, and determining that the distance metric is less than a first predetermined value. The first predetermined value may be determined by any suitable method, such as by analyzing the database of training set feature vectors and determining a correlation between the euclidian distance between training set feature vectors having the same or similar known outcome and/or reason and/or corrective information.

Alternatively, the system may determine whether the first feature vector is similar to any of the training set feature vectors by comparing the numerical values at the same position of the respective vectors in the first feature vector to the numerical values in each of the training set feature vectors.

At step 110, the form analysis system determines that there is a likelihood of a first expected outcome in filing the first government form based on an analysis of the similar feature vectors determined in step 108. For example, the system may determine the first expected outcome based on the number of similar feature vectors having the same particular outcome, such as a positive outcome or a negative outcome. As an example, if a large majority of the similar feature vectors are associated with a negative outcome, or a particular negative outcome (e.g. rejection based on a specific error), then the system will determine that the there is a likelihood of a negative outcome, or the same particular negative outcome, in filing the first government form. If a large majority of the similar feature vectors are associated with a positive outcome, or particular positive outcome (e.g. acceptance based on specific criteria), then the system will determine that the there is a likelihood of a positive outcome, or the same particular positive outcome, in filing the first government form. Determining a "likelihood" of the first expected outcome can be related to a probability based on an analysis of the empirical data from the previously filed government forms, such as a probability of 90% or 80% or 70% or 60% or more likely than not (i.e. about 51%). Hence, the system may analyze all of the training set feature vectors which are similar to the first feature vector, including both positive and negative outcomes, and determine the percentage of training set feature vectors which are similar to the first feature vector. The system can use this percentage to determine a probability that the first feature vector will result in the first expected outcome. The system may also use the level of similarity of the first feature vector to the similar feature vectors to determine the probability. The more similar the first feature vector is to the similar feature vectors having the first expected outcome, the higher the probability the first feature vector will also result in the first negative outcome, and vice versa.

At step 112, if the system determines that the first expected outcome is a likelihood of a positive outcome, then the system reports that filing the first government form will likely result in a positive outcome. For instance, the system may report a confidence level that filing the first government form will result in a positive outcome. For example, if the analysis at step 110 determines a high probability of a positive outcome, then the system may report a high confidence that first government form will result in a positive outcome and/or that no corrective action is required. Similarly, the system determines a medium or lower probability, the system may report the appropriate confidence level, such as "medium," "low" etc. At this point, the method 100 may terminate, and the remaining steps after 112 are unnecessary.

At step 114, if the system determines that the first expected outcome is a likelihood of a negative outcome (also referred to below as a "first negative outcome"), then the system may report that there is a likelihood that the first government form will result in a negative outcome and may also determine and suggest corrective action. Similar to step 112, the system may determine and report a confidence level of the negative outcome, such as "high," "medium," or "low." If the system determines the first expected outcome is a likelihood of negative outcome, then the system may continue to step 116.

At step 116, the form analysis system determines a suggestion for modifying one or more of the data values in the first government form to avoid the first negative outcome based on analyzing the corrective information associated with the similar feature vectors. The system may determine whether there is a common corrective action that is associated with the training set feature vectors which is inferred to be a correction for overcoming the negative outcome. The suggestion may include modifying one or several of the data values in the first government form. The system may also determine what must be changed in the first government form and how it may be changed, such as what information entered for completing the first government form needs to be changed to fix the negative outcome. In the case of a federal tax return, the system may determine a suggestion for modifying a form field in the tax return, a data field in a schedule of the tax return, and/or other underlying data values used to prepare the tax return.

At step 118, the form analysis system provides the suggestion for modifying the data values in the first government form to fix the negative outcome to a preparer of the first government form. The preparer may be a person using a form preparation application (e.g. tax return preparation application), or a system or computing device (e.g. an automated form preparation system, or an intermediary system which then provides the suggestion to a person preparing the form). The suggestion may be provided by any suitable means, such as by an electronic message in the form preparation application, an email, an sms, displaying a suggestion interview screen, etc.

At step 120, the form analysis system requests instructions from the preparer to modify the one or more data values to overcome the first negative outcome. For instance, the system may ask the preparer to check whether a certain data value is correct and to input the correct data value, or it may ask the user to input the correct data type (e.g. numeric or text), or it may ask the user to input missing data. The system may request the input by any suitable means, similar to the means used to provide the suggestion in step 112.

At step 122, the system receives the input requested from the preparer to modify one or more data values. Again, the system may receive the input by any suitable means, same or similar to the means used to provide the suggestion in step 118 and to request input in step 120.

At step 124, the system modifies the one or more data values in the government form according to the instructions received at step 122. In other words, the system re-generates the first government form using the modified data values.

Optionally, the form analysis system may also analyze a modified first government form using the modified data values to determine whether the modifications have corrected the form in order to avoid a likelihood of a negative outcome, including the first negative outcome.

At step 128, the system creates a modified feature vector (e.g. a second feature vector, or nth feature vector for subsequent iterations, as described below) for the first government form using the modified data values.

At step 130, the form analysis system returns to step 106 and repeats the process on the modified feature vector, or subsequent nth feature vector, until a likelihood of a positive outcome results at step 112 for the modified feature vector, or subsequent nth feature vector. The repeated steps result in a modified expected outcome (e.g. second expected outcome, or subsequent nth expected outcome, and so on), and/or modified negative outcome ((e.g. second negative outcome, or subsequent nth negative outcome, and so on).

Figure 3:
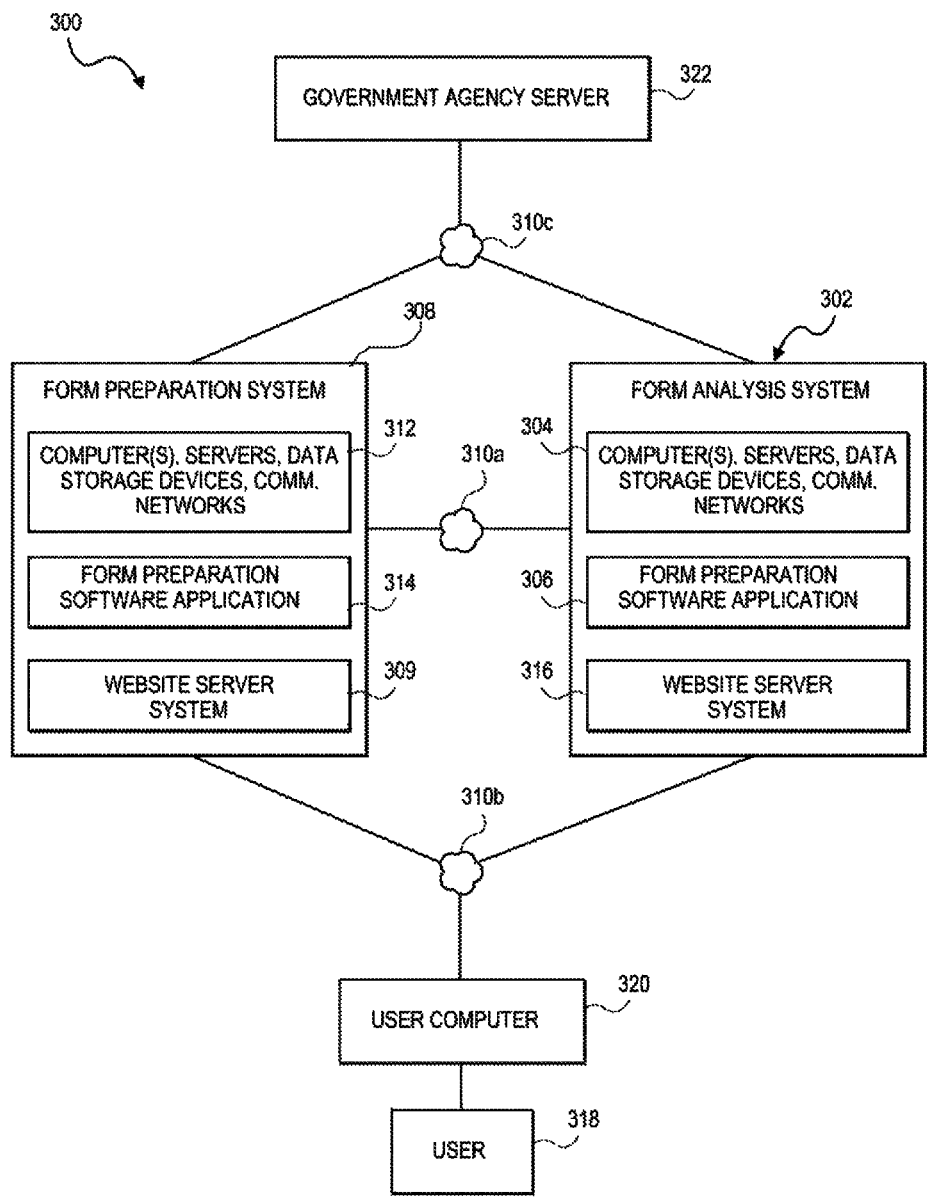
FIG. 3 illustrates a system for analyzing a government form for a filer to be filed with an appropriate government agency, according to still another embodiment of the present invention.

Turning now to FIG. 3, a non-limiting example of a system 300 that may be used to implement the methods 100 and/or 200, as well as any other method embodiments described herein, is shown. It should be understood that not all of the components of the system 300 are needed to implement the methods 100 and/or 200, and therefore, the system 300 may include only those components necessary to perform the method embodiments as described herein. For example, as described above, the system 300 may include just a form analysis system 302 having a computing device and a software application programmed and configured to implement the method embodiments as described herein.

The system 300 comprises a form analysis system 302 having hardware 304 including one or more computers operably coupled together, storage servers, and electronic communication network(s). The form analysis system 302 has software and programming 306 (e.g. form analysis application) configured to perform the method 100, and any other method embodiments described herein, as described above. In the case of a tax return, the form analysis system 302 may be tax return analysis system 302.

The form analysis system 302 can communicate with a form preparation system 308 (e.g. a tax return preparation system 308) via a communication network 310a. The form preparation system 308 includes a computer system 312 and a form preparation software application 314 (e.g. a tax return preparation application). The form preparation system 308 may be a standalone system accessible through the communication network 310a, or it may be an online form preparation system 308 implemented on a website server system 309 and accessible through the internet. The form preparation system 308 may be separate from the form analysis system 302, in that they operate independently and can perform their functionality without the other, and only communicate data between each system via the communication network 310a, or the form preparation system 308 and form analysis system 302 may be integrated into the same system and/or using the same software application.

The form analysis system 302 may also have, or function as, a website server 316. The website server system 316 hosts a website accessible by a user 318 on a user computing device 320 (e.g. computer, or other computing device such as a smartphone, mobile phone, etc.), via a communication network 310b. For example, the computing device 320 can have an internet connection and the communication network 310b may be the internet. The website server system 316 comprises one or more computers, data storage servers and a website server which is in communication with the internet 310b. The website server system 316 and form analysis software application 314 are programmed to perform the steps of the methods 100 and/or 200, and/or any other method embodiments described herein. Accordingly, the website server system 316 includes pages, files and programming to interact with, and display web pages on, an internet-connected device such as computing device 320 through the internet 310b. The user 318 accesses and utilizes the website server system 316 through the computing device 320 connected to the internet 310b using a web browser, for example. The website server system 316 may be a collection of servers in operable communication with each other in which at least one of the servers is connected to the internet 310b. The website server system 316 may be integrated with the other components of the form analysis system 302, or it may a separate, stand-alone system networked to the form analysis system 302 through a communication network such as 310a or 310b.

Similarly, the website server system 309 may be integrated with the other components of the form preparation system 308, or it may a separate, stand-alone system networked to the form preparation system 308 through a communication network such as 310a or 310b. Accordingly, the website server system 309 includes pages, files and programming to interact with, and display web pages on, an internet-connected device such as computing device 320 of the user 318 through the internet 310b. The user 318 accesses and utilizes the website server system 309 through the computing device 320 connected to the internet 310b using a web browser, for example. The website server system 309 may be a collection of servers in operable communication with each other in which at least one of the servers is connected to the internet 310b. The website server system 309 may be integrated with the other components of the form preparation system 308, or it may a separate, stand-alone system networked to the form preparation system 308 through a communication network such as 310a or 310b.

The form analysis system 302 and/or form preparation system 308 may also be configured to communicate with a government agency server 322 of a government agency to which the government form is to be filed, such as the IRS, a state tax authority, or other tax collecting entity, through a network 310c. The form analysis system 302 and/or form preparation system 308 may also function as an electronic filing server. In this case, the form analysis system 302 and/or form preparation system 308 may be configured to electronically file the government forms (e.g. filing of tax returns, filing extensions and/or make electronic tax payments). For this purpose, as shown in FIG. 2, the form analysis system 202 and/or form preparation system 208 are also operably coupled to or in communication with the government agency server 322 through a suitable communication network 310c.

Each of the networks 310a-c (generally referred to as network 310) may be different, or two or more networks 310 may be the same depending on the system configuration and communication protocols employed. One or more or all of the networks 310 may be, for example, a cellular network, a wireless network, a Local Area Network (LAN) and/or a Wide Area Network (WAN). Thus, reference to a network 310 generally is not intended to refer to a specific network or communications protocol, and it should be understood that embodiments can be implemented using various networks and combinations thereof.

Accordingly, the system 300 is configured to perform at least one of the method embodiments of the present invention, including method 100 and/or 200, and any other method embodiments described herein. For example, the user 318 may use the computing device 320 to transmit data values for a first government form to the form analysis system 302, or the user may input data into the form preparation system for completing the form and the form preparation system 308 may transmit the data values for the first government form to the form analysis system 302. The form analysis system 302 analyzes and determines whether there is a likelihood of a negative outcome in the first government form, provides suggestions for modifying the form to fix the negative outcome via the computing device 320, receives instructions from the user 318 for modifying the data values, and then determine whether the negative outcome is fixed, as described in more detail above for method 100.

Figure 4:
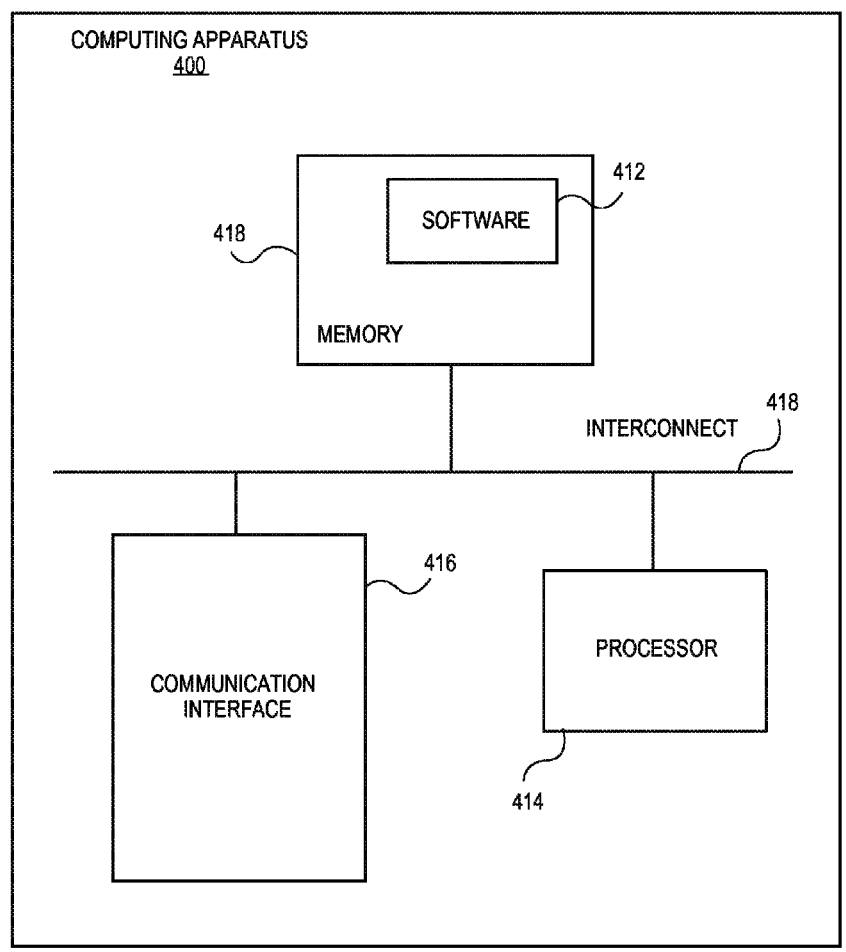
FIG. 4 is a block diagram of a computing device (computer) which may be utilized in the system of FIG. 3.

FIG. 4 generally shows a block diagram of the components of an example of a computer (computing device) 400 that may be used as the computer in the computers and servers identified in the system 300 of FIG. 3, such as the user computing device 320, computer(s) 304 of form analysis system 302, computer(s) 312 of the form preparation system 308, and the website servers 316 and 309. The computer 400 includes a memory 410, application software 412, a processor or controller 414 to execute the application software 412, and a network or communications interface 416, e.g., for communications with a network or interconnect 418 between the components. The memory 410 may be, or include, one or more of cache, RAM, ROM, SRAM, DRAM, RDRAM, EEPROM, SDRAM and other types of volatile or non-volatile memory capable of storing data. The processor unit 414 may be, or include, multiple processors, a single threaded processor, a multi-threaded processor, a multi-core processor, or other type of processor capable of processing data. Depending on the particular system component (e.g., whether the component is a computer or a hand held mobile communications device), the interconnect 418 may include a system bus, LDT, PCI, ISA, or other types of buses, and the communications or network interface may, for example, be an Ethernet interface, a Frame Relay interface, or other interface. The network interface 416 may be configured to enable a system component to communicate with other system components across a network which may be a wireless or various other networks. It should be noted that one or more components of computing device 400 may be located remotely and accessed via a network. Accordingly, the system configuration provided in FIG. 4 is provided to generally illustrate how embodiments may be configured and implemented.

The methods 100 and/or 200 shown in FIGS. 1 and 2, as well as other method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform any of the described methods. The computer program carrier is readable by a computer and embodies instructions executable by the computer to perform the method steps of programming a computer to perform the methods 100 and/or 200, or any other method embodiments described herein. Carriers may be, for example, magnetic storage medium, optical storage medium and magneto-optical storage medium. Examples of carriers include, but are not limited to, a floppy diskette, a memory stick or a flash drive, a hard drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A computer-implemented method of analyzing a first government form for a filer to be filed with an appropriate government agency, the method being performed on a computer, comprising:

a form analysis system receiving a plurality of data values for completing the first government form for the filer, the form analysis system comprising at least one computer having a computer processor and software programming;

the form analysis system creating a first feature vector using the plurality of data values;

the form analysis system comparing the first feature vector to a set of training set feature vectors for previously filed government forms of the same type of government form as the first government form, each of the training set feature vectors associated with a respective known outcome, wherein the set of training set feature vectors includes one or more training set feature vectors associated with a negative outcome wherein a negative outcome means a form was rejected or disapproved by a government agency and one or more training set feature vectors associated with a positive outcome wherein a positive outcome means a form was accepted and approved by a government agency, and for each training set feature vector having a negative outcome, a respective reason for such negative outcome, and respective corrective information comprising modifications made to the respective previously filed government forms which fixed the respective negative outcome;

the form analysis system determining that the first feature vector is within a predetermined distance of one or more training set feature vectors, the training set feature vectors within the predetermined distance referred to as "the first similar feature vectors";

the form analysis system determining a likelihood of a first expected outcome in filing the first government form based on determining that the first feature vector is within a predetermined distance of the first similar feature vectors;

the form analysis system determining that the first expected outcome is a first negative outcome;

the form analysis system modifying one or more of the data values for reducing the likelihood of the first negative outcome based on analyzing the corrective information associated with the first similar feature vectors.

2. The method of claim 1, wherein the step of determining that the first feature vector is within a predetermined distance of one or more training set feature vectors comprises determining whether a euclidian distance between the first feature vector and the one or more training set feature vectors is within the predetermined distance.

3. The method of claim 1, wherein the step of the form analysis system modifying one or more of the data values for reducing the likelihood of the first negative outcome based on analyzing the corrective information associated with the first similar feature vectors comprises:

the form analysis system determining a suggestion for modifying one or more of the data values for reducing the likelihood of the first negative outcome based on analyzing the corrective information associated with the first similar feature vectors.

4. The method of claim 3, wherein the step of the form analysis system modifying one or more of the data values for reducing the likelihood of the first negative outcome based on analyzing the corrective information associated with the first similar feature vectors comprises:

the form analysis system providing the suggestion to a preparer of the form;

the form analysis system receiving instructions from the preparer to modify the one or more data values in the suggestion; and the form analysis system modifying the one or more data values according to the instructions received from the preparer.

5. The method of claim 4, further comprising:

(a) the form analysis system creating a modified feature vector using the one or more modified data values;

(b) the form analysis system comparing the modified feature vector to the set of training set feature vectors;

(c) the form analysis system determining that the modified feature vector is within the predetermined distance of one or more training set feature vectors referred to as "the modified similar feature vectors";

(d) the form analysis system determining a likelihood of a modified expected outcome in filing the first government form based on determining that the modified feature vector is within the predetermined distance of the modified similar feature vectors; and (e) the form analysis system determining that the modified expected outcome is a positive outcome, and reporting a likelihood of a positive outcome.

6. The method of claim 4, further comprising (a) the form analysis system creating a modified feature vector using the one or more modified data values;

(b) the form analysis system comparing the modified feature vector to the set of training set feature vectors;

(c) the form analysis system determining that the modified feature vector is within the predetermined distance of one or more training set feature vectors referred to as "the modified similar feature vectors";

(d) the form analysis system determining a likelihood of a modified expected outcome in filing the first government form based on determining that the modified feature vector is within the predetermined distance of the modified similar feature vectors; and (e) the form analysis system determining that the modified expected outcome is a negative outcome, referred to as a modified negative outcome;

(f) the form analysis system determining a suggestion for modifying one or more of the data values for reducing the likelihood of the modified negative outcome based on analyzing the corrective information associated with the modified similar feature vectors;

(g) the form analysis system modifying one or more of the data values for reducing the likelihood of the modified negative outcome based on analyzing the corrective information associated with the first similar feature vectors; and the form analysis repeating steps (a)-(g) until the form analysis system determines that the modified expected outcome is a positive outcome, and the form analysis system reporting a likelihood of a positive outcome.

7. The method of claim 5, wherein determining that the modified feature vector is within a predetermined distance of the one or more modified similar feature vectors comprises determining that a euclidian distance between the modified feature vector and the one or more modified similar feature vectors is within the predetermined distance.

8. The method of claim 6, wherein the modified negative outcome is the same as the first negative outcome.

9. The method of claim 6, wherein the modified negative outcome is different than the first negative outcome.

10. The method of claim 1, wherein a reason for the first negative outcome is an error in the government form which caused a rejection of the government form.

11. A computer-implemented method of analyzing a first tax return of a taxpayer, comprising:

a tax return analysis system receiving a plurality of data values for preparing the tax return, the tax return analysis system comprising at least one computer having a computer processor and software programming;

the tax return analysis system creating a first feature vector using the plurality of data values;

the tax return analysis system comparing the first feature vector to a set of training set feature vectors for previously filed tax returns, the tax analysis system comparing the first feature vector to a set of training set feature vectors for previously filed tax returns, each of the training set feature vectors associated with a respective known outcome, wherein the set of training set feature vectors includes one or more training set feature vectors associated with a negative outcome wherein a negative outcome means a tax return was rejected or resulted in an audit by a tax authority to which the tax return was filed and one or more training set feature vectors associated with a positive outcome wherein a positive outcome means a tax return was accepted and did not result in an audit by a tax authority to which the tax return was filed, and for each training set feature vector having a negative outcome, a respective reason for such negative outcome, and respective corrective information comprising modifications made to the respective previously filed government forms which fixed the respective negative outcome;

the tax return analysis system determining that the first feature vector is within a predetermined distance of one or more training set feature vectors, the training set feature vectors within the predetermined distance referred to as "the first similar feature vectors";

the tax return analysis system determining a likelihood of a first expected outcome in filing the first tax return based on determining that the first feature vector is within a predetermined distance of the first similar feature vectors;

the tax return analysis system determining that the expected outcome is a first negative outcome; and the tax analysis system modifying one or more of the data values for reducing the likelihood of the first negative outcome based on analyzing the corrective information associated with the first similar feature vectors.

12. The method of claim 11, wherein the step of determining that the first feature vector is within a predetermined distance of one or more training set feature vectors comprises determining whether a euclidian distance between the first feature vector and the one or more training set feature vectors is within the predetermined distance.

13. The method of claim 11, wherein the step of the tax return analysis system modifying one or more of the data values for reducing the likelihood of the first negative outcome based on analyzing the corrective information associated with the first similar feature vectors comprises:
the tax return analysis system determining a suggestion for modifying one or more of the data values for reducing the likelihood of the first negative outcome based on analyzing the corrective information associated with the first similar feature vectors.

14. The method of claim 13, wherein the step of the tax return analysis system modifying one or more of the data values for reducing the likelihood of the first negative outcome based on analyzing the corrective information associated with the first similar feature vectors comprises:
the tax return analysis system providing the suggestion to a preparer of the tax return;
the tax return analysis system receiving instructions from the preparer to modify the one or more data values in the suggestion; and
the tax return analysis system modifying the one or more data values according to the instructions received from the preparer.

15. The method of claim 14, further comprising:
(a) the tax return analysis system creating a modified feature vector using the one or more modified data values;
(b) the tax return analysis system comparing the modified feature vector to the set of training set feature vectors;
(c) the tax return analysis system determining that the modified feature vector is within the predetermined distance of one or more training set feature vectors referred to as "the modified similar feature vectors";
(d) the tax return analysis system determining a likelihood of a modified expected outcome in filing the first tax return based on determining that the modified feature vector is within the predetermined distance of the modified similar feature vectors; and
(e) the tax return analysis system determining that the modified expected outcome is a positive outcome, and reporting a likelihood of a positive outcome.

16. The method of claim 14, further comprising:
(a) the tax return analysis system creating a modified feature vector using the one or more modified data values;
(b) the tax return analysis system comparing the modified feature vector to the set of training set feature vectors;

(c) the tax return analysis system determining that the modified feature vector is within the predetermined distance of one or more training set feature vectors referred to as "the modified similar feature vectors";
(d) the tax return analysis system determining a likelihood of a modified expected outcome in filing the first tax return based on determining that the modified feature vector is within the predetermined distance of the modified similar feature vectors; and
(e) the tax return analysis system determining that the modified expected outcome is a negative outcome, referred to as a modified negative outcome;
(f) the tax return analysis system determining a suggestion for modifying one or more of the data values for reducing the likelihood of the modified negative outcome based on analyzing the corrective information associated with the modified similar feature vectors;
(g) the tax return analysis system modifying one or more of the data values for reducing the likelihood of the modified negative outcome based on analyzing the corrective information associated with the first similar feature vectors; and
the tax return analysis system repeating steps (a)-(g) until the tax return analysis system determines that the modified expected outcome is a positive outcome, and the tax return analysis system reporting a likelihood of a positive outcome.

17. The method of claim 15, wherein determining that the modified feature vector is within the predetermined distance of the one or more modified similar feature vectors comprises determining that a euclidian distance between the modified feature vector and the one or more modified similar feature vectors is within the predetermined distance.

18. The method of claim 16, wherein the modified negative outcome is the same as the first negative outcome.

19. The method of claim 16, wherein the modified negative outcome is different than the first negative outcome.

20. The method of claim 11, wherein a reason for the first negative outcome is an error in the tax return which caused a rejection of the tax return.

21. A system for analyzing a government form for a filer to filed with an appropriate government agency, comprising:
a form analysis system comprising at least one computer having a computer processor and software programming, the form analysis system configured for:
receiving a plurality of data values for completing the first government form for the filer;
creating a first feature vector using the plurality of data values;
comparing the first feature vector to a set of training set feature vectors for previously filed government forms of the same type of government form as the first government form, each of the training set feature vectors associated with a respective known outcome, wherein the set of training set feature vectors includes one or more training set feature vectors associated with a negative outcome wherein a negative outcome means a form was rejected or disapproved by a government agency and one or more training set feature vectors associated with a positive outcome wherein a positive outcome means a form was accepted or approved by a government agency, and for each training set feature vector having a known negative outcome, a respective reason for such negative outcome, and respective corrective information comprising modifications made to the respective previously filed government forms which fixed the respective negative outcome;

determining that the first feature vector is within a predetermined distance of one or more training set feature vectors, the training set feature vectors within the predetermined distance referred to as "the first similar feature vectors";

determining a likelihood of a first expected outcome in filing the first government form based on determining that the first feature vector is within the predetermined distance the first similar feature vectors;

determining that the first expected outcome is a first negative outcome; and modifying one or more of the data values for reducing the likelihood of the first negative outcome based on analyzing the corrective information associated with the first similar feature vectors.

22. The system of claim 21, wherein determining that the first feature vector is within the predetermined distance of one or more training set feature vectors comprises determining that a Euclidian distance between the first feature vector and the one or more training set feature vectors is within the predetermined distance.

23. The system of claim 21, wherein modifying one or more of the data values for reducing the likelihood of the first negative outcome based on analyzing the corrective information associated with the first similar feature vectors, comprises:

determining a suggestion for modifying one or more of the data values for reducing the likelihood of the first negative outcome based on analyzing the corrective information associated with the first similar feature vectors.

24. The system of claim 23, wherein modifying one or more of the data values for reducing the likelihood of the first negative outcome based on analyzing the corrective information associated with the first similar feature vectors, comprises:

providing the suggestion to a preparer of the form;

receiving instructions from the preparer to modify the one or more data values in the suggestion; and modifying the one or more data values according to the instructions received from the preparer.

25. The system of claim 24, wherein the form analysis system is further configured for:

(a) creating a modified feature vector using the one or more modified data values;

(b) comparing the modified feature vector to the set of training set feature vectors;

(c) determining that the modified feature vector is within the predetermined distance of one or more training set feature vectors referred to as "the modified similar feature vectors";

(d) determining a likelihood of a modified expected outcome in filing the first government form based on determining that the modified feature vector is within the predetermined distance of the modified similar feature vectors; and (e) determining that the modified expected outcome is a positive outcome, and reporting a likelihood of a positive income.

26. The system of claim 24, further comprising:

(a) creating a modified feature vector using the one or more modified data values;

(b) comparing the modified feature vector to the set of training set feature vectors;

(c) determining that the modified feature vector is within a predetermined distance of one or more training set feature vectors referred to as "the modified similar feature vectors";

(d) determining a likelihood of a modified expected outcome in filing the first government form based on determining that the modified feature vector is within a predetermined distance of the modified similar feature vectors;

(e) determining that the modified expected outcome is a negative outcome, referred to as a modified negative outcome, (f) determining a suggestion for modifying one or more of the data values for reducing the likelihood of the modified negative outcome based on analyzing the corrective information associated with the modified similar feature vectors;

(g) modifying one or more of the data values for reducing the likelihood of the first negative outcome based on analyzing the corrective information associated with the first similar feature vectors and repeating steps (a)-(g) until determining that the modified expected outcome is a positive outcome, and reporting a likelihood of a positive outcome.

27. The system of claim 25, wherein determining that the modified feature vector is within the predetermined distance of the one or more modified similar feature vectors comprises determining that a euclidian distance between the modified feature vector and the one or more modified similar feature vectors is within the predetermined distance.

28. The system of claim 26, wherein the modified negative outcome is the same as the first negative outcome.

29. The system of claim 26, wherein the modified negative outcome is different than the first negative outcome.

30. The system of claim 21, wherein a reason for first negative outcome is an error in the government form.

31. An article of manufacture comprising a non-transitory computer program carrier readable by a computer and embodying instructions executable by the computer to perform a method for analyzing a government form for a filer to be filed with an appropriate government agency, comprising:

receiving a plurality of data values for completing the first government form for the filer;

creating a first feature vector using the plurality of data values;

comparing the first feature vector to a set of training set feature vectors for previously filed government forms of the same type of government form as the first government form, each of the training set feature vectors associated with a respective known outcome, wherein the set of training set feature vectors includes one or more training set feature vectors associated with a negative outcome wherein a negative outcome means a form was rejected or disapproved by a government agency and one or more training set feature vectors associated with a positive outcome wherein a positive outcome means a form was accepted and approved by a government agency, and for each training set feature vector having a known negative outcome, a respective reason for such negative outcome, and respective corrective information comprising modifications made to the respective previously filed government forms which fixed the respective negative outcome;

determining that the first feature vector is within a predetermined distance of one or more training set feature vectors, the training set feature vectors within the predetermined distance referred to as "the first similar feature vectors";

determining a likelihood of a first expected outcome in filing the first government form based on determining that the first feature vector is within a predetermined distance of the first similar feature vectors;

determining that the first expected outcome is a first negative outcome; and modifying one or more of the data values for reducing the likelihood of the first negative outcome based on analyzing the corrective information associated with the first similar feature vectors.

32. The article of claim 31, wherein determining that the first feature vector is within a predetermined distance of one or more training set feature vectors comprises determining that a Euclidian distance between the first feature vector and the one or more training set feature vectors is within the predetermined distance.

33. The article of claim 31, wherein modifying one or more of the data values for reducing the likelihood of the first negative outcome based on analyzing the corrective information associated with the first similar feature vectors, comprises:

determining a suggestion for modifying one or more of the data values for reducing the likelihood of the first negative outcome based on analyzing the corrective information associated with the first similar feature vectors.

34. The article of claim 33, wherein modifying one or more of the data values for reducing the likelihood of the first negative outcome based on analyzing the corrective information associated with the first similar feature vectors, comprises:

providing the suggestion to a preparer of the form;

receiving instructions from the preparer to modify the one or more data values in the suggestion; and modifying the one or more data values according to the instructions received from the preparer.

35. The article of claim 34, wherein the method further comprises:

(a) creating a modified feature vector using the one or more modified data values;

(b) comparing the modified feature vector to the set of training set feature vectors;

(c) determining that the modified feature vector is within the predetermined distance of one or more training set feature vectors referred to as "the modified similar feature vectors";

(d) determining a likelihood of a modified expected outcome in filing the first government form based on determining that the modified feature vector is within the predetermined distance of the modified similar feature vectors;

(e) determining that the modified expected outcome is a positive outcome, and reporting a likelihood of a positive outcome.

36. The article of claim 34, further comprising (a) creating a modified feature vector using the one or more modified data values;

(b) comparing the modified feature vector to the set of training set feature vectors;

(c) determining that the modified feature vector is within the predetermined distance of one or more training set feature vectors referred to as "the modified similar feature vectors";

(d) determining a likelihood of a modified expected outcome in filing the first government form based on determining that the modified feature vector is within the predetermined distance of the modified similar feature vectors;

(e) determining that the modified expected outcome is a negative outcome, referred to as a modified negative outcome;

(f) determining a suggestion for modifying one or more of the data values for reducing the likelihood of the modified negative outcome based on analyzing the corrective information associated with the modified similar feature vectors;

(g) modifying one or more of the data values for reducing the likelihood of the first negative outcome based on analyzing the corrective information associated with the first similar feature vectors and repeating steps (a)-(g) until determining that the modified expected outcome is a positive outcome, and reporting a likelihood of a positive outcome.

37. The article of claim 35, wherein determining that the modified feature vector is within the predetermined distance of the one or more modified similar feature vectors comprises determining that a euclidian distance between the modified feature vector and the one or more modified similar feature vectors is within the predetermined distance.

38. The article of claim 36, wherein the modified negative outcome is the same as the first negative outcome.

39. The article of claim 36, wherein the modified negative outcome is different than the first negative outcome.

40. The article of claim 31, wherein a reason for negative outcome is an error in the government form associated with the rejection.

* * * * *